United States Patent
Honishi et al.

(10) Patent No.: US 6,792,611 B2
(45) Date of Patent: Sep. 14, 2004

(54) SERVER SYSTEM DETERMINING SERVER APPLICATION CORRESPONDING TO PROCESSING REQUEST BASED ON INFORMATION HELD IN SERVER

(75) Inventors: Yoshitaka Honishi, San Jose, CA (US); Kazuo Imada, Kawasaki (JP); Kouichi Miura, Kawasaki (JP); Takashige Furukawa, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 446 days.

(21) Appl. No.: 09/943,051

(22) Filed: Aug. 31, 2001

(65) Prior Publication Data

US 2002/0046303 A1 Apr. 18, 2002

Related U.S. Application Data

(63) Continuation of application No. PCT/JP99/01336, filed on Mar. 17, 1999.

(30) Foreign Application Priority Data

Mar. 17, 1999 (WO) .............................. PCT/JP99/01336

(51) Int. Cl.[7] .............................................. G06F 9/00
(52) U.S. Cl. .................. 719/328; 717/116; 717/120; 717/137
(58) Field of Search .............................. 717/100–167; 709/200–253, 313–316, 327–330; 719/328

(56) References Cited

U.S. PATENT DOCUMENTS

| | | | |
|---|---|---|---|
| 5,745,683 A | 4/1998 | Lee et al. | 395/200.8 |
| 5,793,965 A | 8/1998 | Vanderbilt et al. | 395/200.33 |
| 6,226,690 B1 * | 5/2001 | Banda et al. | 709/315 |
| 6,564,205 B2 * | 5/2003 | Iwata et al. | 707/2 |

FOREIGN PATENT DOCUMENTS

| | | | |
|---|---|---|---|
| EP | 0733968 A2 | 9/1996 | |
| EP | 0794493 A2 | 9/1997 | |
| EP | 0794493 A2 * | 9/1997 | G06F/9/46 |
| JP | 10124319 A | 5/1998 | |
| JP | 10-187468 A | 7/1998 | |
| WO | WO 96/08765 | 3/1996 | |

OTHER PUBLICATIONS

Yoshitaka Honishi, "Bunsan Object Kiban Object Director", p. 93–97, Fujitsu, vol. 48, No. 2, Mar., 1997.
Masahiko Narita, CORBA to Java Busan Object Gijutsu K.K. Software Research Center, p. 83–85, May 25, 1997.
Yoshitaka Honishi, "Bunsan Object Kiban Object Director", pp. 93–97, Fujitsu, vol. 48, No. 2.
Masahiko Narita, "CORBA to JAVA bunsan Ojbect gijutsu", K.K. Software Research Center, pp. 127–135, pp. 83–85.
Kazuhiko Noba, Kazuhiko Sawamura, "Object shikou COBOL", pp. 168–176, Fujitsu, vol. 48, No. 2.

* cited by examiner

Primary Examiner—Meng-Al T. An
Assistant Examiner—Charles Anya
(74) Attorney, Agent, or Firm—Staas & Halsey LLP

(57) ABSTRACT

In a server system: an information holding unit holds information on one of a plurality of processing units which should execute processing in response to each of a plurality of types of processing requests; a processing-request receiving unit receives a processing request; a determining unit determines one of the plurality of processing units as a processing unit which should execute the received processing request, based on the information held by the information holding unit; and a calling unit calls the determined one of the plurality of processing units so that the one of the plurality of processing units executes the received processing request.

3 Claims, 13 Drawing Sheets

FIG. 2(A)

```
interface AAA {
   long add(p1, p2);
   long sub(p1, p2);
}
```
31

FIG. 2(B)

```
interface BBB::AAA {
   long multi(p1, p2);
   long div(p1, p2);
   long add(p3);
   struct {
      long p1;
      long p2;
   } p3;
}
```
32

| DESCENDANT | ANCESTOR | OBJECT-ORIENTED LANGUAGE | NON-OBJECT-ORIENTED LANGUAGE |
|---|---|---|---|
| OBJECT-ORIENTED LANGUAGE | SAME LANGUAGE AS ANCESTOR | ○ | |
| | DIFFERENT LANGUAGE FROM ANCESTOR | × | × |
| NON-OBJECT-ORIENTED LANGUAGE | | × | × |

FIG. 13
PRIOR ART

SERVER SYSTEM DETERMINING SERVER APPLICATION CORRESPONDING TO PROCESSING REQUEST BASED ON INFORMATION HELD IN SERVER

This application is a continuing application, filed under 35 U.S.C. §111(a), of International Application PCT/JP99/01336, filed Mar. 17, 1999.

BACKGROUND OF THE INVENTION

1) Field of the Invention

The present invention relates to a server system which executes processing defined in an interface in response to a processing request, and enables inheritance of functionality between applications.

2) Description of the Related Art

In the recently developed client-server systems, client and server applications are linked so that a client application can request a server application to execute processing, and the server application can return a result of the processing to the client application. In the client-server systems, interfaces (groups of methods which can be used by other programs) of the server applications are defined, and development of client and server applications independent of programming languages of the other client and server applications in each client-server system is becoming possible. That is, when a client uses a method of a server, the client need only output a request in accordance with a predefined interface. Thus, the efficiency in development of distributed processing systems can be increased when the distributed processing systems are constructed by using the above interfaces.

Incidentally, extension of functionality of an existing interface is often required in an operating client-server system. Conventionally, when functionality of an existing interface is extended, it is necessary to newly produce a server application for executing processing corresponding to the extended functionality, and integrate the newly produced server application with an existing server application corresponding to the existing interface. If it is known that the existing server application is described in an object-oriented programming language such as C++ and Java (which is a registered trademark of Sun Microsystems, Inc.), and the above server application corresponding to the extended functionality is produced in the same object-oriented programming language as the existing server application, the interface having the extended functionality can inherit a portion of the existing interface. That is, when both of the existing and extended interface are described in an identical object-oriented programming language, the extended interface can be produced by utilizing a portion of the existing interface, and thus productivity of applications can be increased.

However, inheritance of an interface is possible only when server applications corresponding to existing and functionality-extended interfaces are described in an identical object-oriented programming language. That is, in the conventional client-server systems, a server application described in an object-oriented programming language cannot inherit from an interface of another server application described in a different object-oriented programming language. For example, only server applications described in the programming language C++ can inherit from an interface of another server application described in the programming language C++.

In addition, when a first server application is described in a first non-object-oriented programming language, and a second server application is described in a second programming language different from the first programming language, the second server application cannot inherit from an interface of the first server application regardless of whether the second programming language is object-oriented or not.

FIG. 13 indicates possibility of inheritance in various cases in which applications corresponding to ancestors and descendants are described in object-oriented and non-object-oriented programming languages. In FIG. 13, each blank circle ("O") indicates that inheritance is possible, and each cross ("X") indicates that inheritance is impossible.

As indicated in FIG. 13, the inheritance is possible only in the very limited case. In addition, when a user wishes to extend functionality of an interface of a server application which is supplied from a computer manufacturer or the like, generally, the programming language which describes the server application is unknown to the user.

Further, in the case where inheritance is impossible, it is necessary to produce a routine for re-requesting existing server applications to execute existing methods, as well as a server application corresponding to a new interface. However, it is a time-consuming job to produce the above routine for all of the existing methods which are required to be used in the new interface.

SUMMARY OF THE INVENTION

The object of the present invention is to provide a server system which enables a first program to easily inherit a method of a second program, regardless of whether the programming languages of the first and second programs are identical or not.

(1) According to the first aspect of the present invention, there is provided a server system comprising: a plurality of processing units which execute processing in accordance with a plurality of types of processing requests; an information holding unit which holds information on one of the plurality of processing units which should execute processing in response to each of the plurality of types of processing requests; a processing-request receiving unit which receives a processing request; a determining unit which determines one of the plurality of processing units as a processing unit which executes the processing request received by the processing-request receiving unit, based on the information held by the information holding unit; and a calling unit which calls the one of the plurality of processing units so that the one of the plurality of processing units executes the processing request received by the processing-request receiving unit.

The server system according to the first aspect of the present invention may have one or any possible combination of the following additional features (i) and (ii).

(i) The plurality of processing units execute processing in accordance with a plurality of definitions in a plurality of interfaces.

(ii) The information held by the information holding unit indicates at least one first method defined in a first one of the plurality of interfaces corresponding to each of the plurality of processing units and at least one ancestor interface from which the first one of the plurality of interfaces inherits. The processing request received by the processing-request receiving unit designates a second one of the plurality of interfaces, and requests execution of a second method. The determining unit determines, as the processing unit which executes the processing request received by the processing-request receiving unit, one of the plurality of processing units corresponding to the second one of the plurality of interfaces when the second one of the plurality of interfaces defines the second method. The determining unit determines, as the processing unit which executes the processing request received by the processing-request receiving unit, one of the plurality of processing units corresponding to one of the at least one ancestor interface from which the second one of the plurality of interfaces inherits, when the second one of the plurality of interfaces does not define the second method, and the one of the at least one ancestor interface from which the second one of the plurality of interfaces inherits defines the second method.

(2) According to the second aspect of the present invention, there is provided a server system comprising a plurality of servers each of which includes: a plurality of processing units which execute processing in accordance with a plurality of types of processing requests; an information holding unit which holds information on one of the plurality of processing units which should execute processing in response to each of the plurality of types of processing requests; a processing-request receiving unit which receives a processing request; a determining unit which determines one of the plurality of processing units as a processing unit which executes the processing request received by the processing-request receiving unit, based on the information held by the information holding unit; and a calling unit which calls the one of the plurality of processing units so that the one of the plurality of processing units executes the processing request received by the processing-request receiving unit. The server system further comprises a location-information holding unit which holds an identifier of a first one of the plurality of servers in which each of the plurality of processing units is implemented, together with a name indicating a functional feature of the processing unit, an inquiry receiving unit which receives an inquiry designating a name of a processing function of a second one of the plurality of processing units, and a responding unit which acquires from the location-information holding unit an identifier of a second one of the plurality of servers in which the second one of the plurality of processing units is implemented, and outputs a response to the inquiry in which the identifier of the second one of the plurality of servers is indicated.

The server system according to the second aspect of the present invention may have one or any possible combination of the aforementioned additional features (i) and (ii).

(3) According to the third aspect of the present invention, there is provided a computer-readable storage medium storing a program which instructs a computer to realize the server according to the first aspect of the present invention.

The server system realized with the computer-readable storage medium according to the third aspect of the present invention may have one or any possible combination of the aforementioned additional features (i) and (ii).

As described above, in the server system according to the present invention, a processing unit which executes a processing request received by the processing-request receiving unit is determined based on information held by the information holding unit. When a processing unit is newly added to the server system, and the newly added processing unit cannot execute at least one desired method which at least one existing processing unit has, the additional processing unit becomes able to inherit the at least one desired method of the at least one existing processing unit by merely setting in the information holding unit information which enables execution of the at least one desired method by the at least one existing processing unit. Thus, inheritance of methods between processing units becomes possible even when the programming languages which describe the processing units are different.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

In the drawings:

FIG. 2A is a diagram illustrating an example of abstract interface definition;

FIG. 2B is a diagram illustrating another example of abstract interface definition;

FIG. 13 indicates possibility of inheritance in various cases in which applications corresponding to ancestors and descendants are described in object-oriented and non-object-oriented programming languages.

DESCRIPTION OF THE PREFERRED EMBODIMENT

An embodiment of the present invention is explained in detail below with reference to drawings.

(1) Basic Construction

Figure 1:
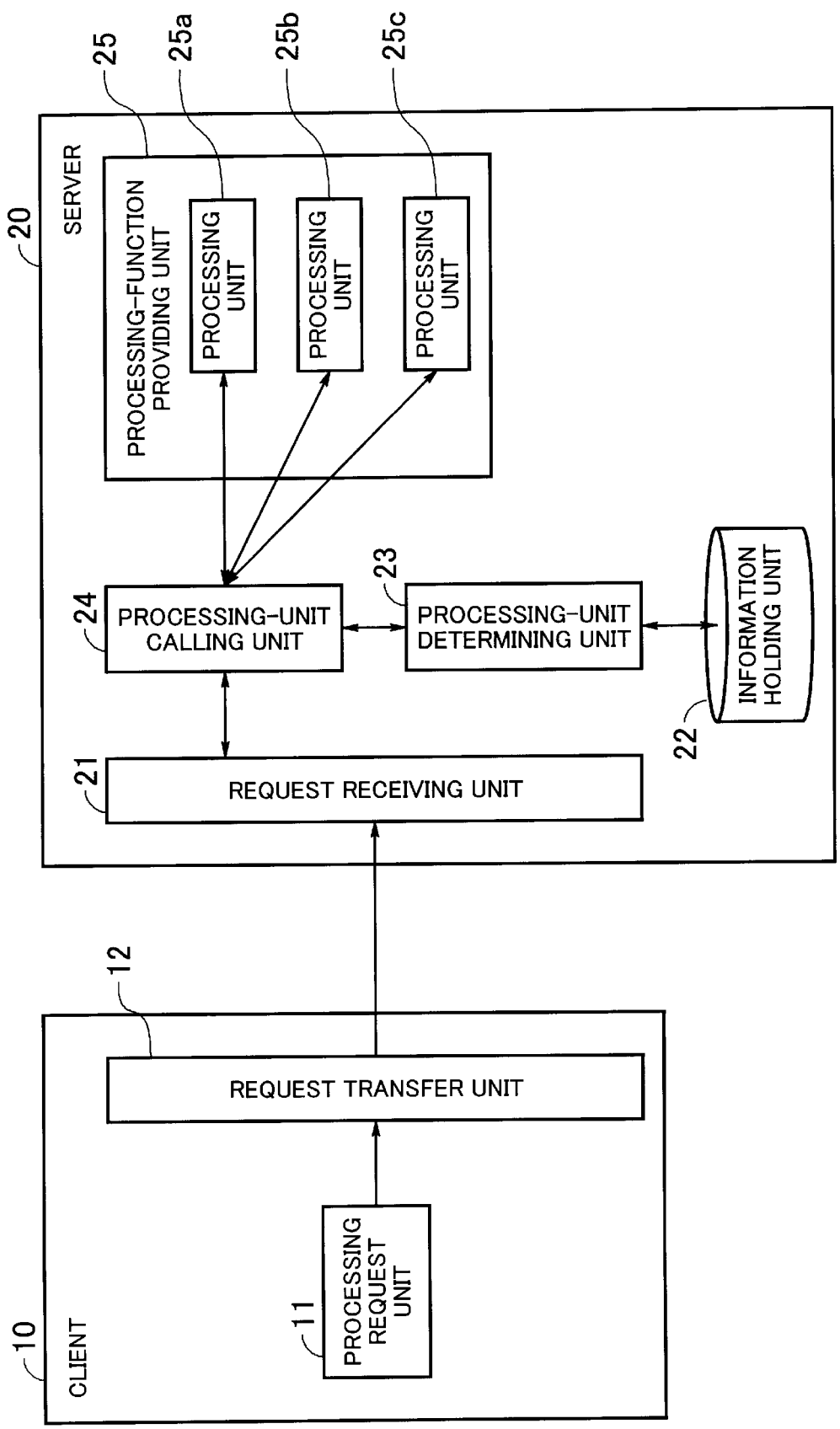
FIG. 1 is a diagram illustrating a basic construction of an information processing system according to the present invention.

FIG. 1 is a diagram illustrating a basic construction of a client-server system which enables inheritance of programs between different programming languages according to the present invention. In FIG. 1, reference numeral 10 denotes a client and 20 denotes a server. The client 10 comprises a processing request unit 11 and a request transfer unit 12. The processing request unit 11 outputs a processing request directed to a server such as the server 20. The request transfer unit 12 transfers the processing request output from the processing request unit 11, to the server (e.g., the server 20).

The server 20 comprises a request receiving unit 21, an information holding unit 22, a processing-unit determining unit 23, a processing-unit calling unit 24, and a processing-function providing unit 25. The processing-function providing unit 25 includes a plurality of processing units 25a to 25c. The processing units 25a to 25c may be described in different programming languages, and each of the processing units 25a to 25c may be described in one or more programming languages. The request receiving unit 21 has a function of receiving a processing request from the client 10, and transfers the processing request to the processing-unit calling unit 24. The information holding unit 22 holds information indicating a processing unit which should execute each type of processing request. The processing-unit determining unit 23 determines a processing unit which should execute each type of processing request by referring to the information holding unit 22. In addition, the processing-unit determining unit 23 updates the contents of the information holding unit 22. When the processing-unit calling unit 24 receives a processing request from the request receiving unit 21, the processing-unit calling unit 24 inquires of the processing-unit determining unit 23 as to a processing unit which should execute the processing request, receives a response indicating a processing unit which is determined by the processing-unit determining unit 23, and calls the determined processing unit so that the processing unit executes the processing request. Each of the processing units 25a to 25c executes processing in accordance with the processing request from the client 10 when the processing unit is called by the processing-unit calling unit 24.

The operation of the above client-server system is explained below.

When a processing request is output from the processing request unit 11 in the client 10, the processing request is sent by the request transfer unit 12 to the server 20. When the request receiving unit 21 in the server 20 receives the processing request, the request receiving unit 21 passes the processing request to the processing-unit calling unit 24, and the processing-unit calling unit 24 inquires of the processing-unit determining unit 23 which one of the processing units 25a to 25c should execute the processing request. Then, the processing-unit determining unit 23 refers to the contents of the information holding unit 22, and determines one of the processing units 25a to 25c which should execute the processing request. The processing-unit calling unit 24 calls the one of the processing units 25a to 25c determined by the processing-unit determining unit 23, so that the determined one of the processing units 25a to 25c executes the processing request.

As described above, according to the present invention, one of the processing units 25a to 25c which should execute each processing request is determined based on the information held by the information holding unit 22. When a new processing unit is added to the processing-function providing unit 25, the information holding unit 22 can be updated so as to hold first information indicating processing requests which can be executed by the new processing unit and second information which enables at least one existing processing unit to execute at least one type of processing requests which cannot be executed by the new processing unit. In this case, it is sufficient for the new processing unit to comprise only at least one method which existing processing units cannot execute, since the new processing unit can inherit the methods of the existing processing units from the existing processing units.

In addition, the above first information (indicating processing requests which can be executed by the new processing unit) may be information indicating the type of the processing requests which can be executed by the new processing unit, and the above second information (which enables at least one existing processing unit to execute at least one type of processing requests which cannot be executed by the new processing unit) may be at least one identifier of the at least one existing processing unit which can execute the at least one type of processing requests which cannot be executed by the new processing unit. In this case, the contents of the information holding unit 22 can be updated very easily. In addition, the inheritance of at least one method can be enabled regardless of the programming languages of the processing units.

Next, a concrete example of a client-server system to which the present invention is applied is explained below. In the example, the client-server system is a distributed processing system using CORBA (Common Object Request Broker Architecture), and functionality of an interface defined between clients and servers in the system is extended.

(2) Construction of Embodiment

Examples of abstract interface definitions are indicated in FIGS. 2(A) and 2(B), where the interface 31 indicated in FIG. 2(A) is an existing interface, and the interface 32 indicated in FIG. 2(B) is an interface in which functionality is extended. In these examples, the interfaces are defined in the interface definition language (IDL).

In the interface 31 of FIG. 2(A), the name "AAA" of the interface and methods of addition ("add") and subtraction ("sub") are defined. In the interface 32 of FIG. 2(B), the name "BBB" of the interface is defined. In addition, the notation "BBB::AAA" indicates that the interface "BBB" inherits the methods of the interface "AAA". Further, in the interface 32 of FIG. 2(B), methods of multiplication ("multi"), division ("div"), and addition ("add") are defined, where the method of addition ("add") in the interface 32 of FIG. 2(B) receives data of a type different from the type of data received by the method of addition ("add") in the existing interface 31 indicated in FIG. 1. Since the interface 32 inherits from the interface 31, the method of subtraction ("sub") defined in the interface 31 is also effective in the interface 32. In addition, although the method of addition ("add") is defined in each of the interfaces 31 and 32, the method of addition ("add") redefined in the interface 32 is effective in the interface 32.

When the above interfaces 31 and 32 are compiled by an IDL compiler, a stub as a source code for a client application and a skeleton as a source code for a server application are generated. The client and server applications are described in a programming language such as C++ and Java. Since the IDL compiler has a function of mapping to each programming language, the IDL compiler can generate the above stub so as to be described in the same programming language as the client application, and the above skeleton so as to be described in the same programming language as the server application. Thereafter, when the client application is compiled, the stub is linked with the client application, and compiled together with the client application. In addition, when the server application is compiled, the skeleton is linked with the client application, and compiled together with the server application. Therefore, client and server application programs can be generated so as to comply with the defined interfaces. Thus, when the generated server application program is implemented in the server, the server can execute processing in accordance with the definitions in the above interfaces.

Hereinafter, the term "application" means a group of at least one processing function realized by execution of an application program by a central processing unit (CPU).

Figure 3:
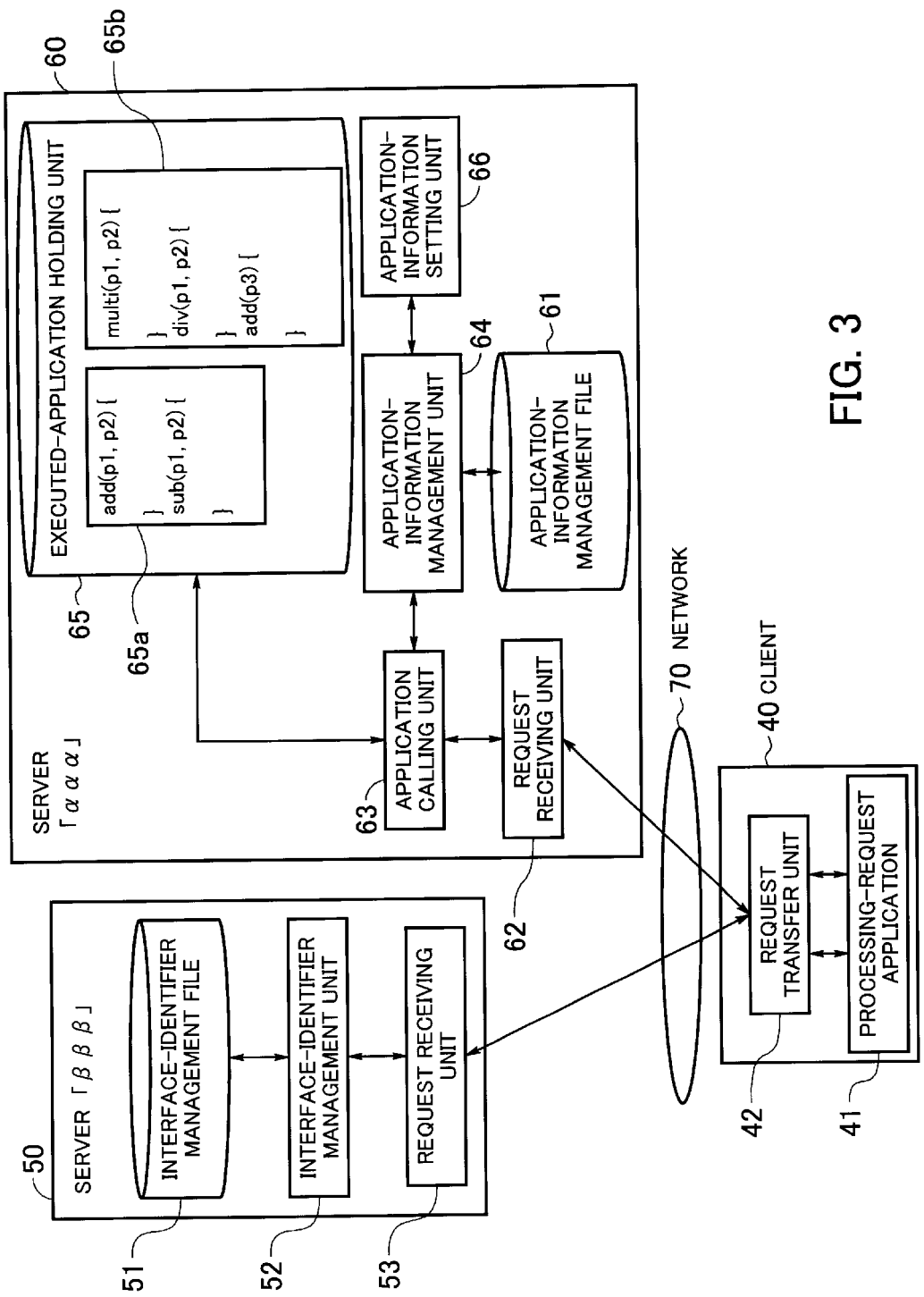
FIG. 3 is a diagram illustrating a construction of a client-server system as an embodiment of the present invention.

FIG. 3 is a diagram illustrating a construction of a client-server system as an embodiment of the present invention. In the construction of FIG. 3, a client 40 is connected to servers 50 and 60 through a network 70.

The client 40 comprises a processing-request application 41 and a request transfer unit 42. The processing-request application 41 is an application which outputs a processing request, and the request transfer unit 42 transfers the processing request from the processing-request application 41 to each of the servers 50 and 60. The server 50 has a name "βββ", and comprises an interface-identifier management file 51, an interface-identifier management unit 52, and a request receiving unit 53. A name of an interface and a correspondence between the interface and an application which should execute processing corresponding to the interface are registered in the interface-identifier management file 51.

Figure 4:
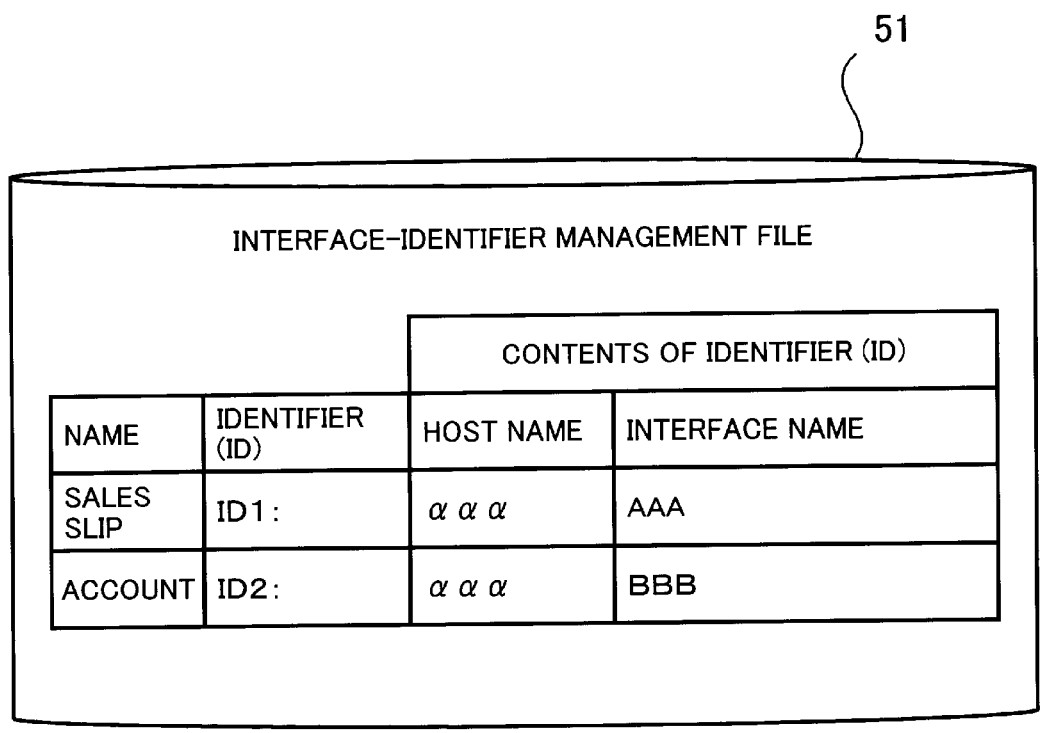
FIG. 4 is a diagram illustrating an example of the interface-identifier management file.

FIG. 4 is a diagram illustrating an example of the interface-identifier management file 51. In the interface-identifier management file 51 of FIG. 4, a name (processing name) of each processing function and an identifier (ID) corresponding to the name (processing name) are registered. The processing name is determined so that users of the client 40 can easily remember the name. In order to identify each interface, each identifier (ID) includes a host name and an interface name. The host name is the name of a server in which an application program which executes processing corresponding to the interface is implemented. The interface name is an identifier assigned to the interface.

In this example, the identifier (ID) "ID1" corresponds to the processing name "SALES SLIP", and includes the host name "ααα" and the interface name "AAA". In addition, the identifier (ID) "ID2" corresponds to the processing name "ACCOUNT", and includes the host name "ααα" and the interface name "BBB".

When the processing-request application 41 accesses the interface "AAA", the processing-request application 41 can obtain the corresponding identifier (ID) from the interface-identifier management file 51 based on the processing name "SALES SLIP". Similarly, when the processing-request application 41 accesses the interface "BBB", the processing-request application 41 can obtain the corresponding identifier (ID) from the interface-identifier management file 51 based on the processing name "ACCOUNT".

Referring back to FIG. 3, the request receiving unit 53 receives from client 40 an inquiry about a server which can execute desired processing, and passes the inquiry to the interface-identifier management unit 52. When the interface-identifier management unit 52 receives the inquiry about a server through the request receiving unit 53 from the client 40, and the inquiry designates an interface name, the interface-identifier management unit 52 acquires information corresponding to the designated interface name from the interface-identifier management file 51, where the acquired information includes an identifier (e.g., a host name) of a server, an identifier (ID), or the like corresponding to the interface name. Then, the interface-identifier management unit 52 returns the acquired information through the request receiving unit 53 to the client 40. That is, the request receiving unit 53 receives the response from the interface-identifier management unit 52, and transfers the response to the client 40.

The server 60 has a name "ααα" in the network, and comprises an application-information management file 61, a request receiving unit 62, an application calling unit 63, an application-information management unit 64, an executed-application holding unit 65, and an application-information setting unit 66. In the application-information management file 61, a correspondence between each type of processing request and an application which should execute the processing request is registered.

Figure 5:
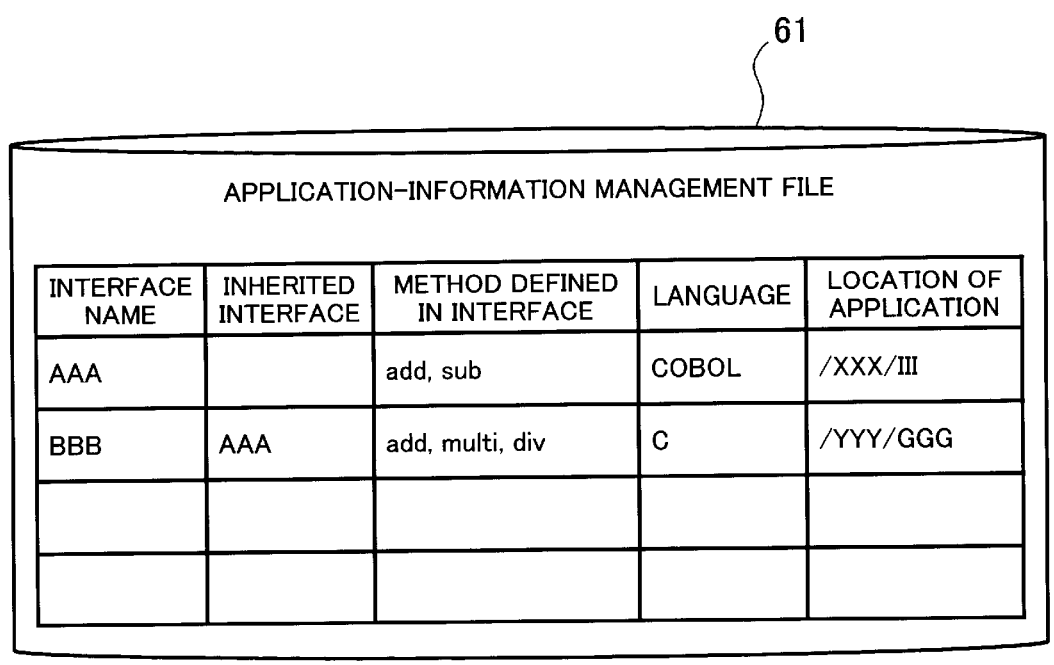
FIG. 5 is a diagram illustrating an example of the application-information management file.

FIG. 5 is a diagram illustrating an example of the application-information management file 61. The application-information management file 61 includes columns for items "INTERFACE NAME", "INHERITED INTERFACE", "METHOD DEFINED IN INTERFACE", "LANGUAGE", and "LOCATION OF APPLICATION". In the column for the item "INTERFACE NAME", a name of each interface implemented in the server 60 is registered. In the column for the item "INHERITED INTERFACE", a name of an interface from which each interface implemented in the server 60 inherits at least one method is registered. In the column for the item "METHOD DEFINED IN INTERFACE", at least one name (method name) of at least one method which is defined in each interface implemented in the server 60 is registered. In the column for the item "LANGUAGE", information indicating a programming language in which an application program corresponding to each interface implemented in the server 60 is described is registered. In the column for the item "LOCATION OF APPLICATION", a location, in a directory, of an application which should execute a method defined in each interface implemented in the server 60 is registered in the form of a path from a predetermined location.

In the example of FIG. 5, the item "INHERITED INTERFACE" for the interface name "AAA" indicates "none", the item "METHOD DEFINED IN INTERFACE" for the interface name "AAA" indicates the method names "add" and "sub", the item "LANGUAGE" for the interface name "AAA" indicates "COBOL", and the item "LOCATION OF APPLICATION" for the interface name "AAA" indicates "/XXX/III". In addition, the item "INHERITED INTERFACE" for the interface name "BBB" indicates "AAA", the item "METHOD DEFINED IN INTERFACE" for the interface name "BBB" indicates the method names "add", "multi" and "div", the item "LANGUAGE" for the interface name "BBB" indicates "C", and the item "LOCATION OF APPLICATION" for the interface name "BBB" indicates "/YYY/GGG".

Referring back to FIG. 3, the request receiving unit 62 receives from a client a processing request including an interface name and a method name, and passes the processing request to the application calling unit 63. The application calling unit 63 transfers an inquiry including the interface name and the method name to the application-information management unit 64. The application-information management unit 64 receives the above inquiry from the application calling unit 63, determines an application which should execute the method corresponding to the interface name and the method name, based on the information registered in the application-information management file 61, and passes the name and the location of the determined application to the application calling unit 63. The application calling unit 63 receives from the application-information management unit 64, as a response to the above inquiry, the name and the location of the application which should execute the method corresponding to the method name, and calls the application so that the application executes the method.

The executed-application holding unit 65 holds a plurality of applications 65a and 65b. The application 65a is an application program which executes the methods defined in the (existing) interface 31 (indicated in FIG. 2(A)), and the application 65b is an application program which executes the methods defined in the (functionality-extended) interface 32 (indicated in FIG. 2(B)). In this example, the application 65a corresponds to the interface name "AAA", has the location "/XXX/III", and is described in the programming language "COBOL". In addition, the application 65b corresponds to the interface name "BBB", has the location "/YYY/GGG", and is described in the programming language "C".

The application-information setting unit 66 has a function of editing the contents of the application-information management file 61 through the application-information management unit 64. That is, the contents of the application-information management file 61 can be updated by the application-information setting unit 66. For example, a user who develops an application can register information on the application by inputting commands through an input device to the application-information setting unit 66 when the application is newly implemented in a server. In addition, it is possible to arrange in the application-information setting unit 66 a function of analyzing interfaces which are used when applications are produced. In this case, the function of analyzing interfaces can be arranged to automatically acquire information which are defined in the interfaces (e.g., method names defined in the interfaces), and the application-information setting unit 66 registers the above information in the application-information management file 61 every time the information is acquired.

When the processing-request application 41 in the above client-server system requests an application in the server 60 to execute processing, the following operations are performed.

When the processing-request application 41 inquires of the interface-identifier management unit 52 as to a server in which a desired application is implemented, the interface-identifier management unit 52 returns the name of the server 60 to the processing-request application 41. Then, the processing-request application 41 sends a processing request to the server 60, and the processing request is transferred to the application calling unit 63. The application calling unit 63 inquires of the application-information management unit 64 as to a name of an application which should execute the processing request. The application-information management unit 64 determines the application which should execute the processing request, based on the contents of the processing request or the like, and informs the application calling unit 63 of the determined application. Finally, the application calling unit 63 calls the determined application so that the application executes the processing request. The result of the execution is returned from the application to the processing-request application 41.

(3) Operation of Client

Figure 6:
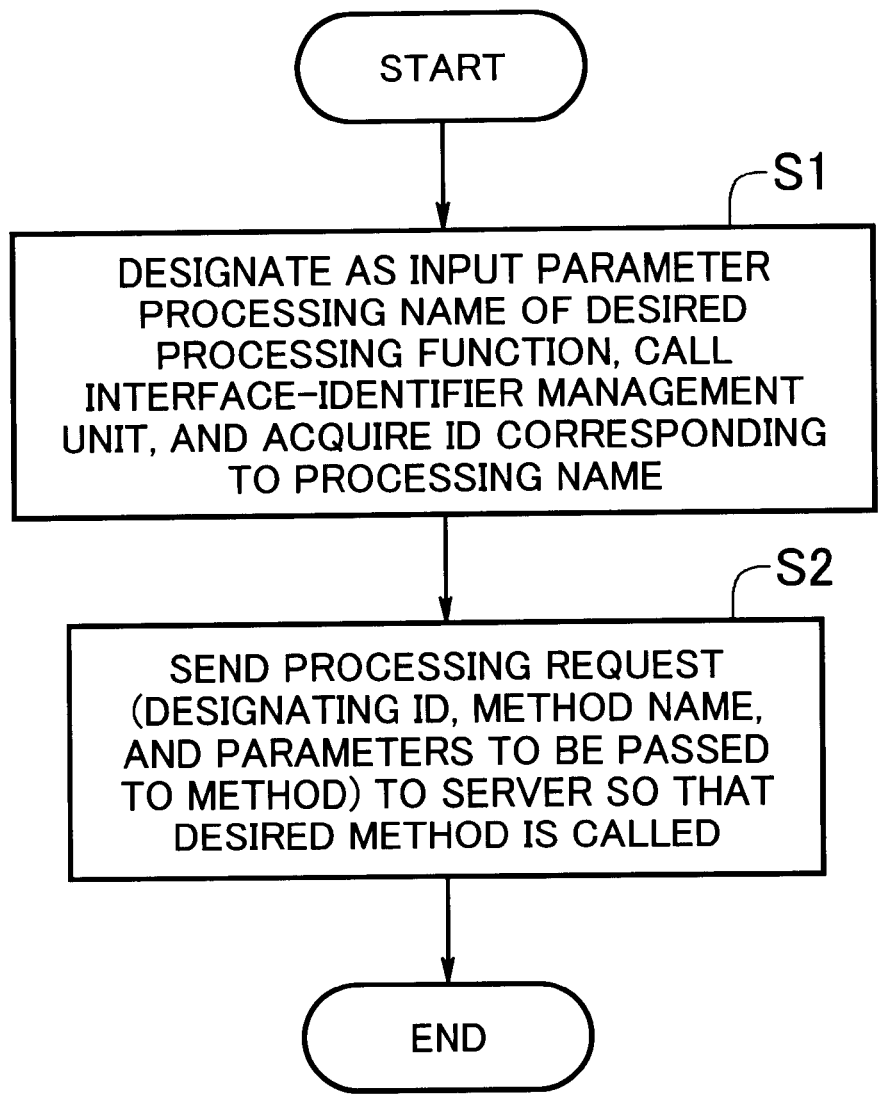
FIG. 6 is a flow diagram illustrating a sequence of operations of the processing-request application in the client.

FIG. 6 is a flow diagram illustrating a sequence of operations of the processing-request application 41 in the client 40.

In step S1, the processing-request application 41 calls the interface-identifier management unit 52 in the server 50 through the request transfer unit 42. Specifically, the client 40 designates as an input parameter a processing name of a processing function which is requested by a user, and acquires an identifier (ID) corresponding to the processing name. For example, when the processing unit "ACCOUNT" is designated, the identifier (ID) "ID2" is acquired, where the identifier (ID) "ID2" contains the host name and the interface name.

In step S2, the processing-request application 41 sends a processing request to a server in which an application which can execute a desired method is implemented, through the request transfer unit 42, so that the desired method is called. At this time, the processing-request application 41 designates the identifier (ID), the method name of the method, and parameters to be passed to the method. For example, the processing-request application 41 sends the identifier (ID) "ID2", the method name "add", and parameters required in the method "add", through the request transfer unit 42 to the server 60.

Figure 7:
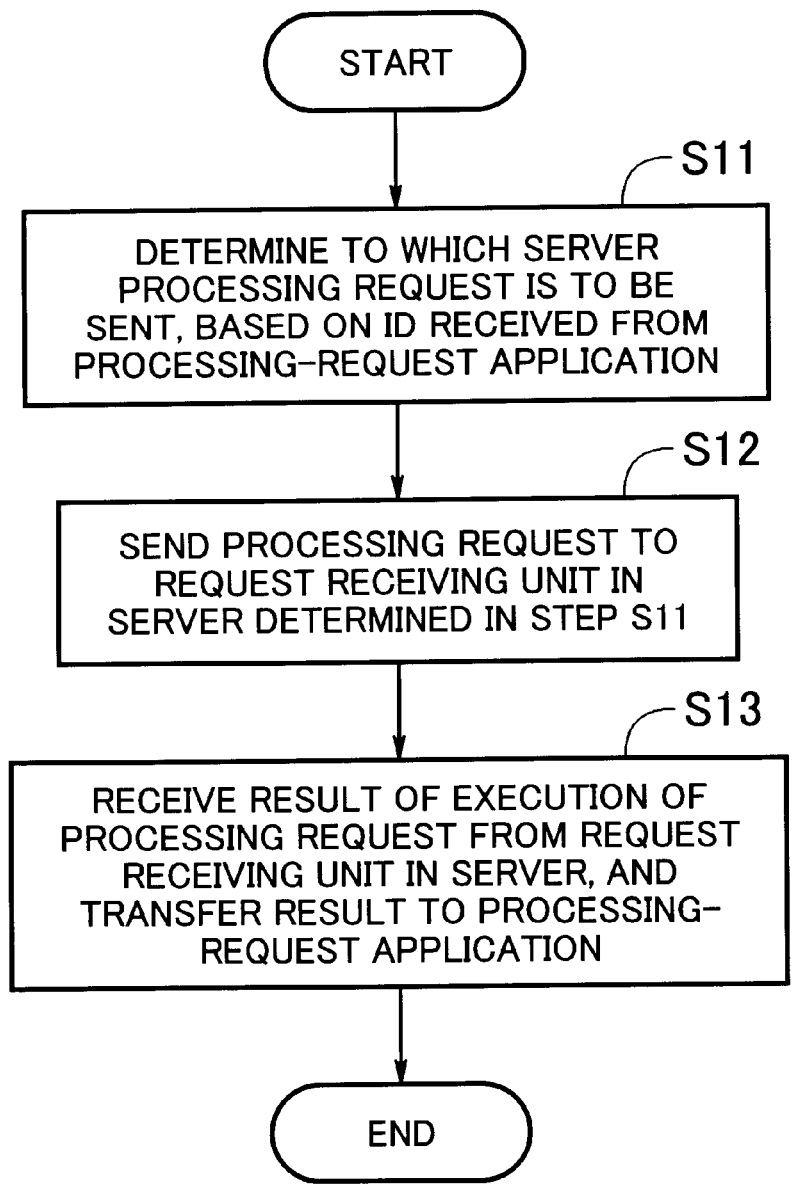
FIG. 7 is a flow diagram illustrating a sequence of operations of the request transfer unit in the client.

FIG. 7 is a flow diagram illustrating a sequence of operations of the request transfer unit 42 in the client 40.

In step S11, the request transfer unit 42 receives from the processing-request application 41 a processing request including an identifier (ID), and determines to which server the processing request is to be sent, based on the identifier (ID). For example, when the received processing request includes the identifier (ID) "ID2", the request transfer unit 42 recognizes the server 60 as the server to which the processing request is to be sent, based on the host name "ααα" included in the identifier (ID) "ID2".

In step S12, the request transfer unit 42 sends the processing request to the request receiving unit 62 in the server determined in step S11.

In step S13, the request transfer unit 42 receives a result of execution of the processing request from the request receiving unit 62 in the server 60, and transfers the result to the processing-request application 41.

(4) Operation of Server 50

Figure 8:
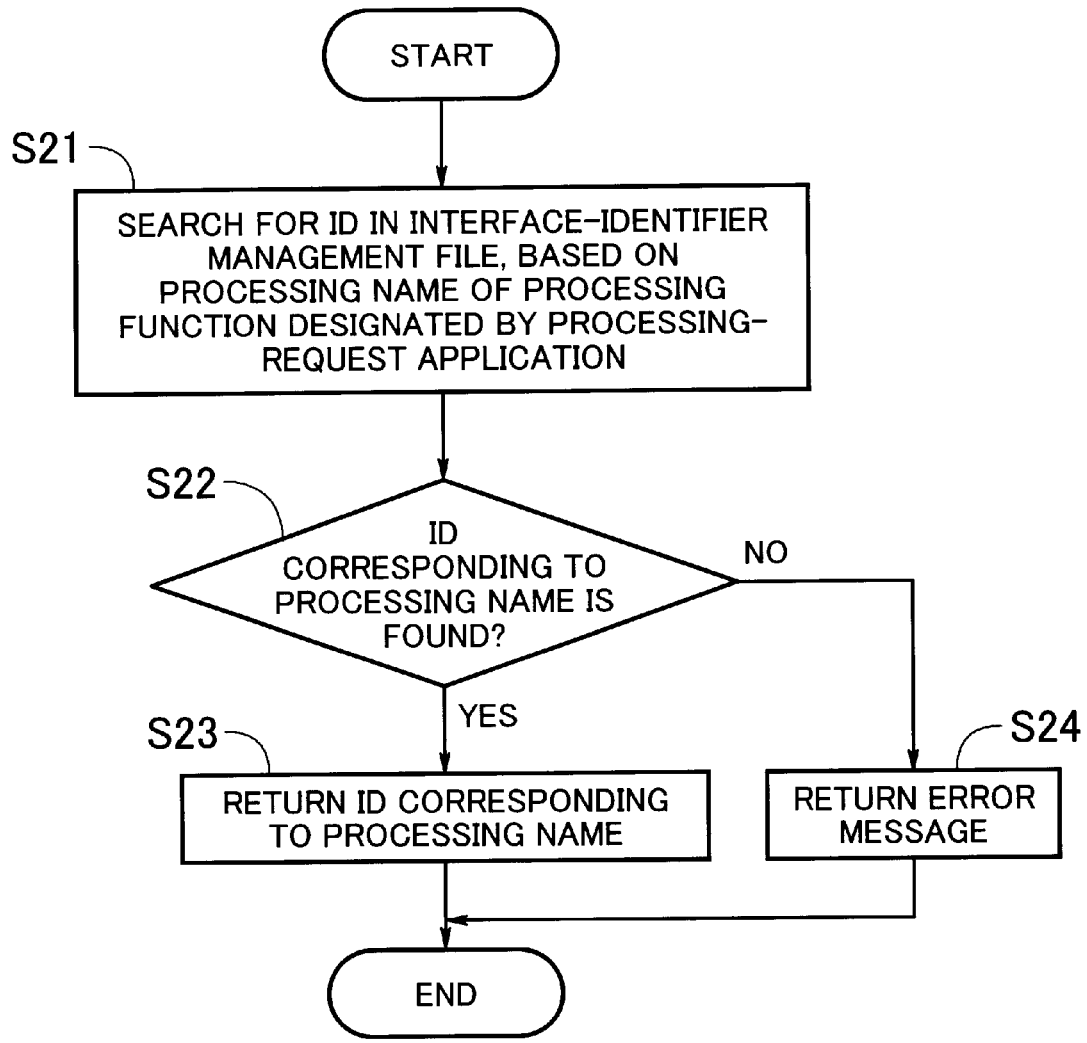
FIG. 8 is a flow diagram illustrating a sequence of operations performed by the interface-identifier management unit in the server when the server is called by the processing-request application in the client.

FIG. 8 is a flow diagram illustrating a sequence of operations performed by the interface-identifier management unit 52 in the server 50 when the interface-identifier management unit 52 in the server 50 is called by the processing-request application 41 in the client 40.

In step S21, the interface-identifier management unit 52 searches for an identifier (ID) in the interface-identifier management file 51, based on a processing name of a processing function designated by the processing-request application 41.

In step S22, the interface-identifier management unit 52 determines whether or not an identifier (ID) corresponding to the processing name is found. When yes is determined in step S22, the operation goes to step S23. When no is determined in step S22, the operation goes to step S24.

In step S23, the interface-identifier management unit 52 returns the identifier (ID) corresponding to the processing name to the processing-request application 41 in the client 40.

In step S24, the interface-identifier management unit 52 returns an error message to the processing-request application 41 in the client 40.

(5) Operation of Server 60

Figure 9:
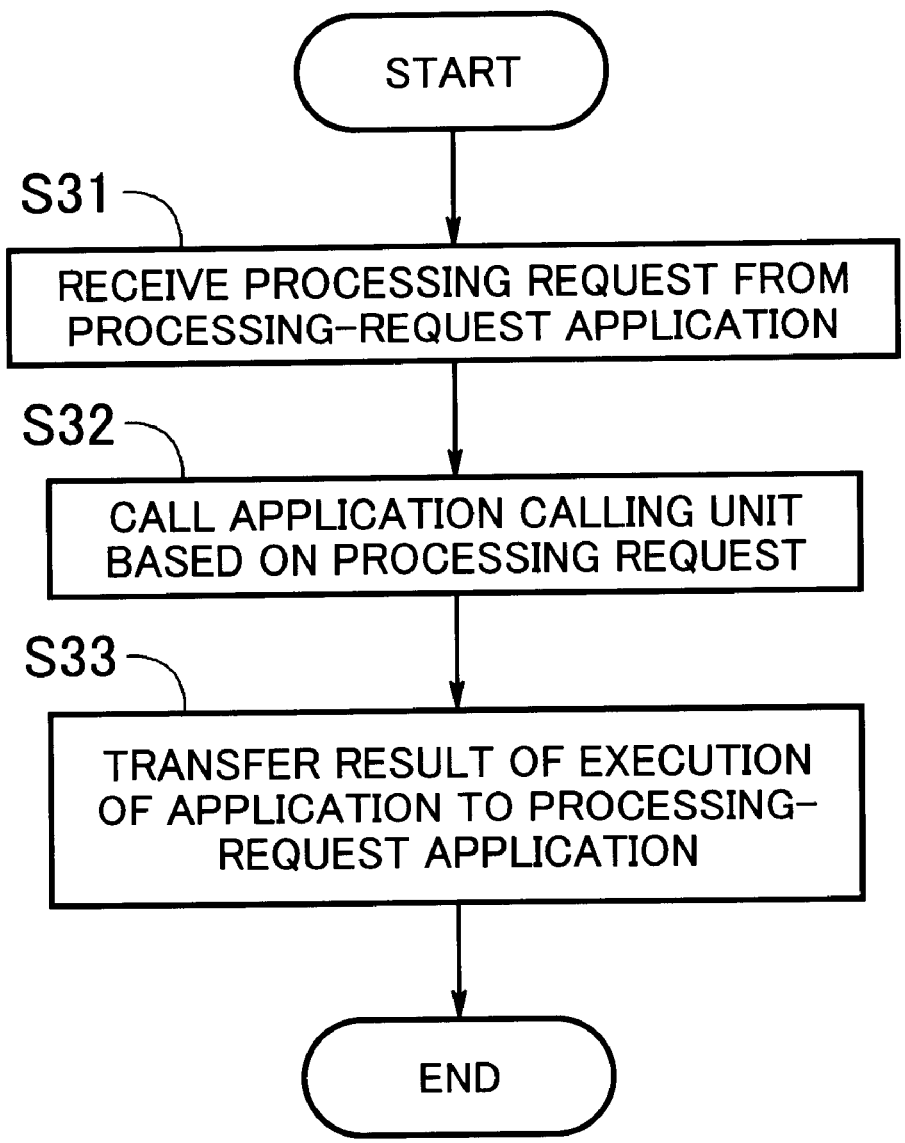
FIG. 9 is a flow diagram illustrating a sequence of operations performed by the request receiving unit in the server when the server receives a processing request from the request transfer unit in the client.

FIG. 9 is a flow diagram illustrating a sequence of operations performed by the request receiving unit 62 in the server 60 when the server 60 receives a processing request from the request transfer unit 42 in the client 40.

In step S31, the request receiving unit 62 receives a processing request from the processing-request application 41.

In step S32, the request receiving unit 62 calls the application calling unit 63 based on the processing request.

In step S33, the request receiving unit 62 transfers a result of execution of the application 65a or 65b to the processing-request application 41.

Figure 10:
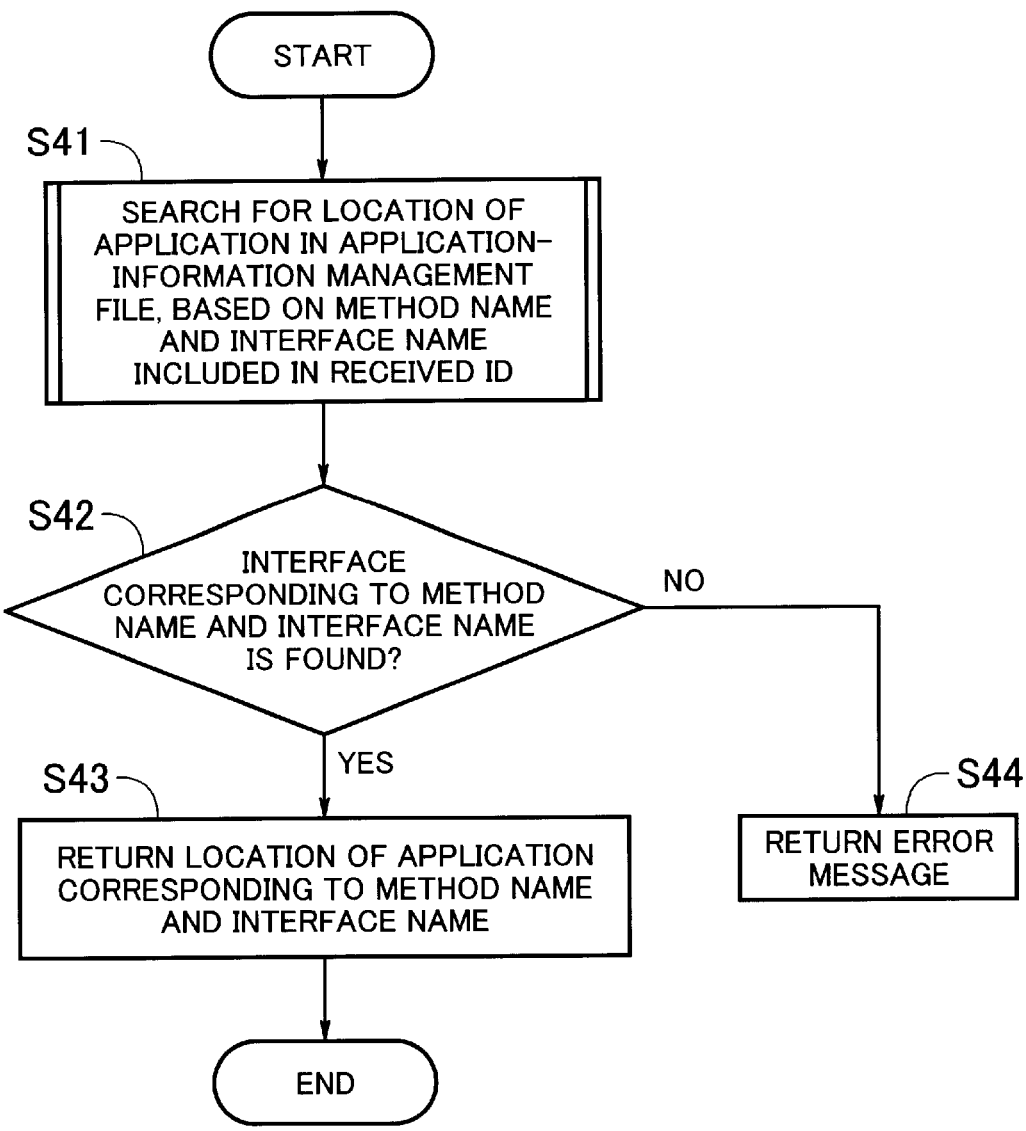
FIG. 10 is a flow diagram illustrating a sequence of operations performed by the application-information management unit in the server when the application-information management unit receives an inquiry about an application from the application calling unit.

FIG. 10 is a flow diagram illustrating a sequence of operations performed by the application-information management unit 64 in the server 60 when the application-information management unit 64 receives an inquiry about an application from the application calling unit 63.

In step S41, the application-information management unit 64 receives an identifier (ID) and a method name, and searches for a location of an application in the application-information management file 61, based on the method name and the interface name included in the identifier (ID). Details of the search are explained later with reference to FIG. 11.

In step S42, the application-information management unit 64 determines whether or not an interface corresponding to the method name and the interface name is found. When yes is determined in step S42, the operation goes to step S43. When no is determined in step S42, the operation goes to step S44.

In step S43, the application-information management unit 64 returns the location of the application corresponding to the method name and the interface name, to the application calling unit 63.

In step S44, the application-information management unit 64 returns an error message to the application calling unit 63.

Figure 11:
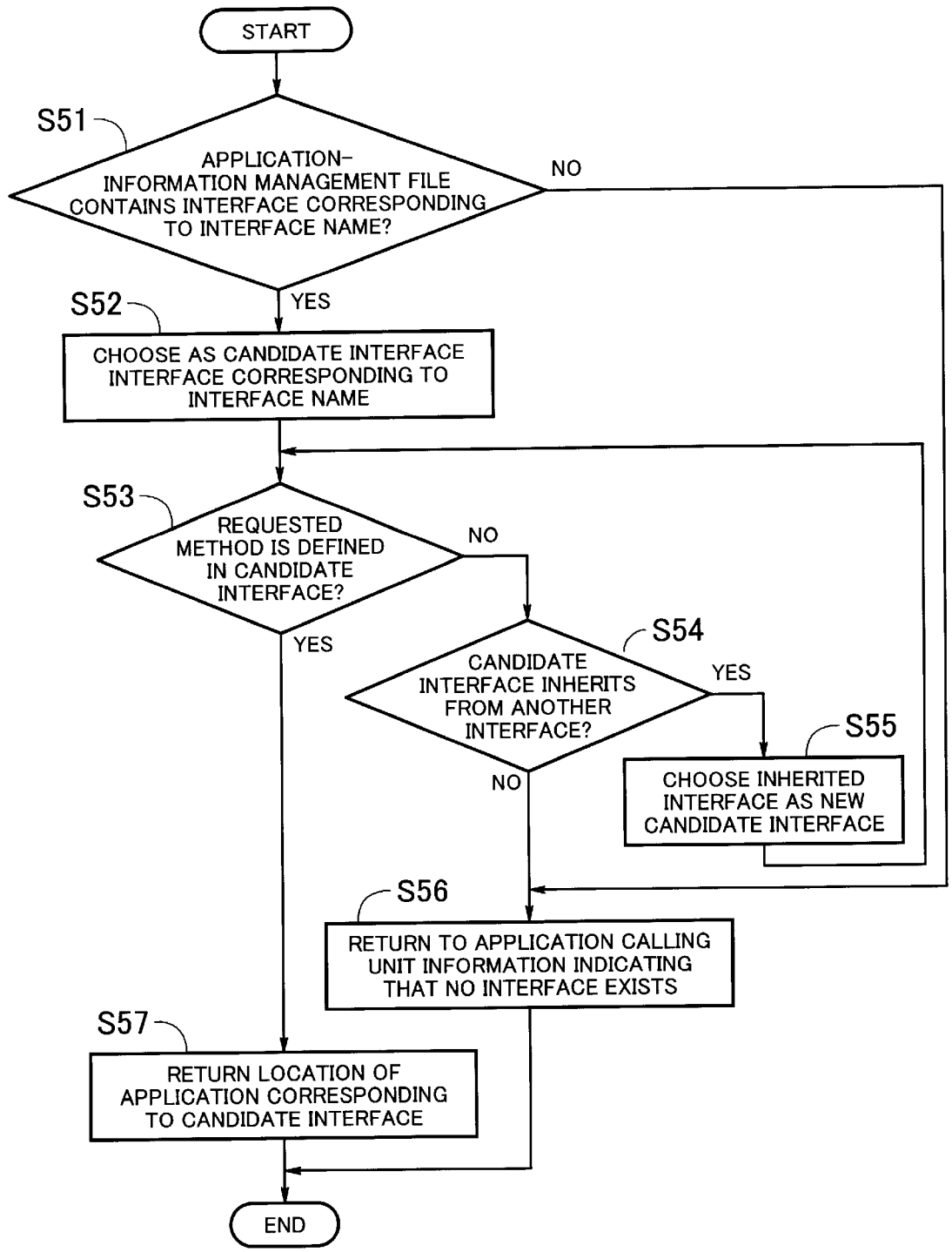
FIG. 11 is a flow diagram illustrating a sequence of the search operation performed in step S41 in FIG. 10 by the application-information management unit.

FIG. 11 is a flow diagram illustrating detailed of the sequence of FIG. 10 by the application-information management unit 64.

In step S51, the application-information management unit 64 determines whether or not the application-information management file 61 contains an interface corresponding to the interface name. When yes is determined in step S51, the operation goes to step S52. When no is determined in step S51, the operation goes to step S56.

In step S52, the application-information management unit 64 chooses as a candidate interface an interface corresponding to the interface name.

In step S53, the application-information management unit 64 determines whether or not a requested method is defined in the candidate interface. When yes is determined in step S53, the operation goes to step S57. When no is determined in step S53, the operation goes to step S54.

In step S54, the application-information management unit 64 determines whether or not the candidate interface inherits from a second interface. When yes is determined in step S54, the operation goes to step S55. When no is determined in step S54, the operation goes to step S56.

In step S55, the application-information management unit 64 chooses the second interface as a new candidate interface, and the operation goes back to step S53.

In step S56, the operation goes to step S44 in the sequence of FIG. 10, and the application-information management unit 64 returns to the application calling unit 63 information indicating that the application-information management file 61 contains no interface corresponding to the interface name and the method name.

In step S57, the operation goes to step S43 in the sequence of FIG. 10, and the application-information management unit 64 returns the location of the application corresponding to the candidate interface as a search result to the application calling unit 63.

Figure 12:
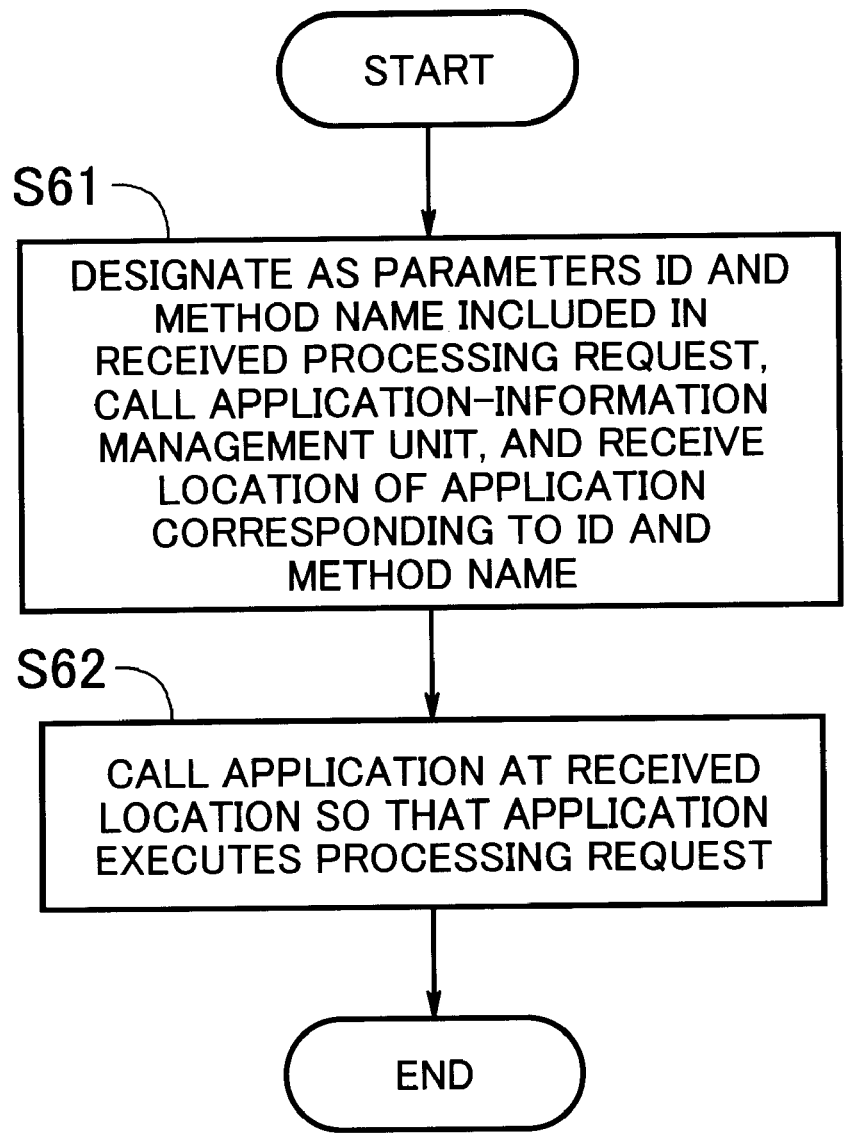
FIG. 12 is a flow diagram illustrating a sequence of operation performed by the application calling unit when the application calling unit receives a processing request.

FIG. 12 is a flow diagram illustrating a sequence of operation performed by the application calling unit 63 when the application calling unit 63 receives a processing request.

In step S61, the application calling unit 63 calls the application-information management unit 64. At this time, the application calling unit 63 designates as parameters an identifier (ID) and a method name included in the received processing request, and receives a location of an application corresponding to the identifier (ID) and the method name.

In step S62, the application calling unit 63 calls the application at the received location so that the application executes the processing request.

(6) Details of Operations

When the processing-request application 41 has a request for execution of a method defined in the interface 32, the processing-request application 41 acquires the identifier (ID) "ID2" of the interface 32 from the interface-identifier management file 51 based on the processing name "ACCOUNT". Then, the processing-request application 41 outputs a processing request directed to the application 65b, based on the identifier (ID), a method name, and parameters to be passed to the method. The request transfer unit 42 determines to which server the processing request is to be transferred, based on the host name "aaa" included in the identifier (ID) "ID2", and transfers the processing request to the server 60.

Thus, the request receiving unit 62 receives the processing request, and passes the processing request to the application calling unit 63. The application calling unit 63 searches the application-information management file 61 based on the identifier (ID) "ID2" and the method name, and calls an application corresponding to the identifier (ID) "ID2" and the method name. For example, when the method name is "add", the application calling unit 63 calls the application 65b corresponding to the interface name "BBB", or when the method name is "sub", the application calling unit 63 calls the application 65a corresponding to the interface name "AAA", from which the interface 32 inherits the method.

(7) Advantages and other Matters (i) As described above, when the processing-request application 41 in the client 40 sends a processing request to a server in which a desired application is implemented, the processing-request application 41 can receive a result of execution of the processing request. At this time, the application-information management unit 64 determines which application actually executes the processing request. Therefore, it is not necessary to provide in the application a routine for transferring the processing request. In addition, the inheritance of methods can be realized independently of the programming language of the applications.

Further, since the processing-request application 41 is informed of the name of the server by the interface-identifier management unit 52, it is not necessary to provided information on locations of respective applications to the processing-request application 41 in advance. Furthermore, it is unnecessary to provided an interface-identifier management file 51 for each machine, and sufficient to provide at least one interface-identifier management file in the network 70.

(ii) According to the present invention, inheritance between different languages, between non-object-oriented languages, or between a non-object-oriented language and an object-oriented language is realized. Therefore, productivity and maintainability of server applications in a client-server system can be enhanced.

(iii) The operations and functions of the servers and the client in the embodiments can be realized by a computer. The functions of the servers or the client can be written as a program, which can be stored in a computer-readable storage medium. The functions can be realized by executing the program by the computer. The computer-readable storage medium may be a magnetic storage device, a semiconductor memory, or the like. In order to put the program into the market, the program may be stored in a portable storage medium such as a CD-ROM (compact-disk read-only memory) and a floppy disc. Alternatively, the program can be stored in a storage device belonging to a first computer, and transferred to a second computer which is connected through a network to the first computer. When the program is executed by a computer, the program can be stored in a hard disk drive or the like belonging to the computer, and loaded into a main memory of the computer.

(iv) The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A server system comprising:
    a plurality of processing units which execute processing in accordance with a plurality of types of processing requests;
    an information holding unit which holds information on one of said plurality of processing units which should execute processing in response to each of said plurality of types of processing requests;
    a processing-request receiving unit which receives a processing request;
    a determining unit which determines one of said plurality of processing units as a processing unit which executes said processing request received by said processing-request receiving unit, based on said information held by said information holding unit; and
    a calling unit which calls said one of said plurality of processing units so that the one of said plurality of processing units executes said processing request received by said processing-request receiving unit,
    wherein said plurality of processing units execute processing in accordance with a plurality of definitions in a plurality of interfaces, and
    wherein said information held by said information holding unit indicates at least one first method defined in a first one of said plurality of interfaces corresponding to each of the plurality of processing units and at least one ancestor interface from which said first one of said plurality of interfaces inherits,
    said processing request received by said processing-request receiving unit designates a second one of said plurality of interfaces, and requests execution of a second method,
    said determining unit determines, as said processing unit which executes said processing request received by said processing-request receiving unit, one of said plurality of processing units corresponding to said second one of said plurality of interfaces when said second one of said plurality of interfaces defines said second method, and
    said determining unit determines, as said processing unit which executes said processing request received by said processing-request receiving unit, one of said plurality of processing units corresponding to one of said at least one ancestor interface from which said second one of said plurality of interfaces inherits, when said second one of said plurality of interfaces does not define said second method, and said one of said at least one ancestor interface from which said second one of said plurality of interfaces inherits defines said second method.

2. A server system comprising a plurality of servers each of which includes:
    a plurality of processing units which execute processing in accordance with a plurality of types of processing requests;
    an information holding unit which holds information on one of said plurality of processing units which should execute processing in response to each of said plurality of types of processing requests;
    a processing-request receiving unit which receives a processing request;
    a determining unit which determines one of said plurality of processing units as a processing unit which executes said processing request received by said processing-request receiving unit, based on said information held by said information holding unit; and
    a calling unit which calls said one of said plurality of processing units so that the one of said plurality of processing units executes said processing request received by said processing-request receiving unit;
    a location-information holding unit which holds an identifier of a first one of said plurality of servers in which each of said plurality of processing units is implemented, together with a name indicating a functional feature of said each of said plurality of processing units,
    an inquiry receiving unit which receives an inquiry designating a name of a processing function of a second one of said plurality of processing units, and
    wherein said plurality of processing units execute processing in accordance with a plurality of definitions in a plurality of interfaces, and
    wherein said information held by said information holding unit indicates at least one first method defined in a first one of said plurality of interfaces corresponding to each of the plurality of processing units and at least one ancestor interface from which said first one of said plurality of interfaces inherits,
    said processing request received by said processing-request receiving unit designates a second one of said plurality of interfaces, and requests execution of a second method,
    said determining unit determines, as said processing unit which executes said processing request received by said processing-request receiving unit, one of said plurality of processing units corresponding to said second one of said plurality of interfaces when said second one of said plurality of interfaces defines said second method, and
    said determining unit determines, as said processing unit which executes said processing request received by said processing-request receiving unit, one of said plurality of processing units corresponding to one of said at least one ancestor interface from which said second one of said plurality of interfaces inherits, when said second one of said plurality of interfaces does not define said second method, and said one of said at least one ancestor interface from which said second one of said plurality of interfaces inherits defines said second method.

3. A computer-readable storage medium storing a program which instructs a computer to realize a server comprising:

a plurality of processing units which execute processing in accordance with a plurality of types of processing requests;

an information holding unit which holds information on one of said plurality of processing units which should execute processing in response to each of said plurality of types of processing requests;

a processing-request receiving unit which receives a processing request;

a determining unit which determines one of said plurality of processing units as a processing unit which executes said processing request received by said processing-request receiving unit, based on said information held by said information holding unit; and a calling unit which calls said one of said plurality of processing units so that the one of said plurality of processing units executes said processing request received by said processing-request receiving units, wherein said plurality of processing units execute processing in accordance with a plurality of definitions in a plurality of interfaces, and wherein said information held by said information holding unit indicates at least one first method defined in a first one of said plurality of interfaces corresponding to each of the plurality of processing units and at least one ancestor interface from which said first one of said plurality of interfaces inherits, said processing request received by said processing-request receiving unit designates a second one of said plurality of interfaces, and requests execution of a second method, said determining unit determines, as said processing unit which executes said processing request received by said processing-request receiving unit, one of said plurality of processing units corresponding to said second one of said plurality of interfaces when said second one of said plurality of interfaces defines said second method, and said determining unit determines, as said processing unit which executes said processing request received by said processing-request receiving unit, one of said plurality of processing units corresponding to one of said at least one ancestor interface from which said second one of said plurality of interfaces inherits, when said second one of said plurality of interfaces does not define said second method, and said one of said at least one ancestor interface from which said second one of said plurality of interfaces inherits defines said second method.

* * * * *